Figure 1:
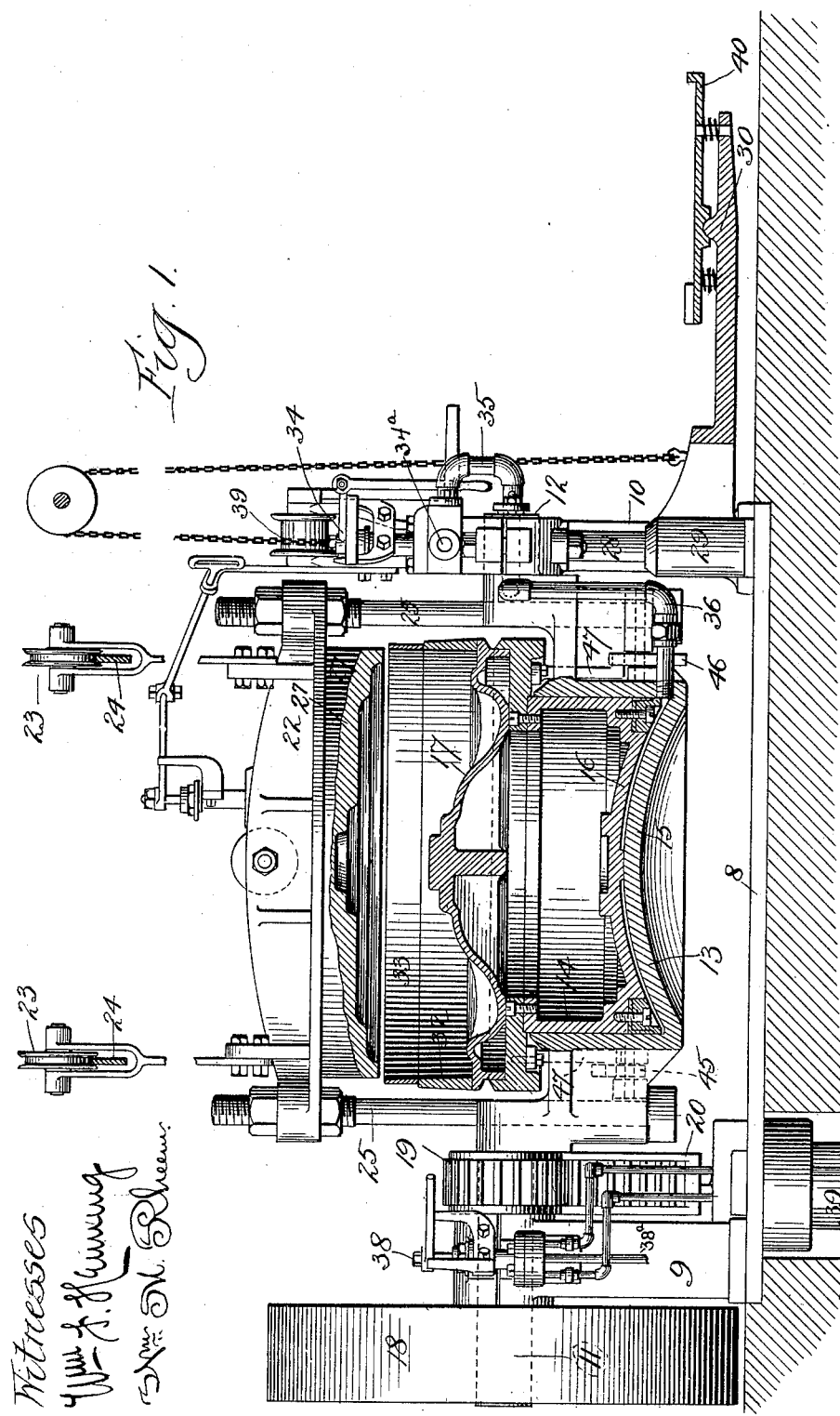

No. 612,801. Patented Oct. 18, 1898.
W. W. DOOLITTLE.
MOLDING MACHINE.
(Application filed Oct. 11, 1897.)
(No Model.) 5 Sheets—Sheet 1.

Witnesses
Inventor
William W. Doolittle

No. 612,801. Patented Oct. 18, 1898.
W. W. DOOLITTLE.
MOLDING MACHINE.
(Application filed Oct. 11, 1897.)
(No Model.) 5 Sheets—Sheet 2.
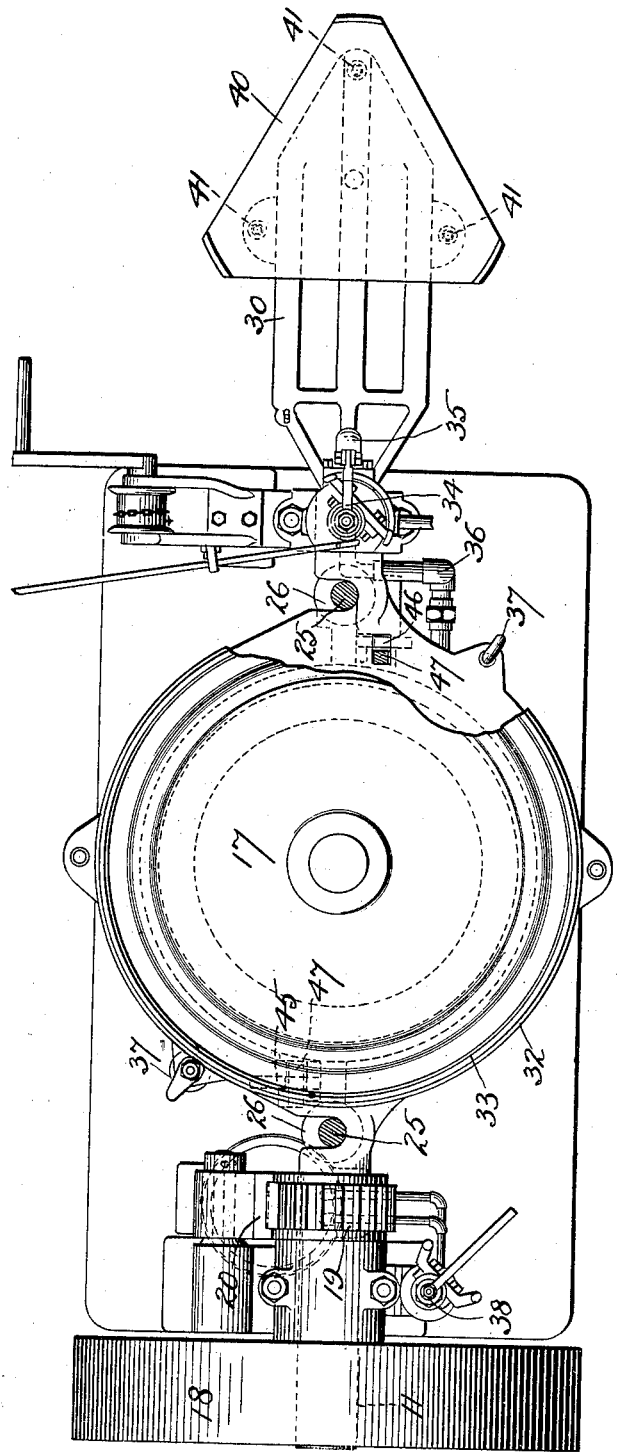

No. 612,801. Patented Oct. 18, 1898.
W. W. DOOLITTLE.
MOLDING MACHINE.
(Application filed Oct. 11, 1897.)
(No Model.) 5 Sheets—Sheet 3.
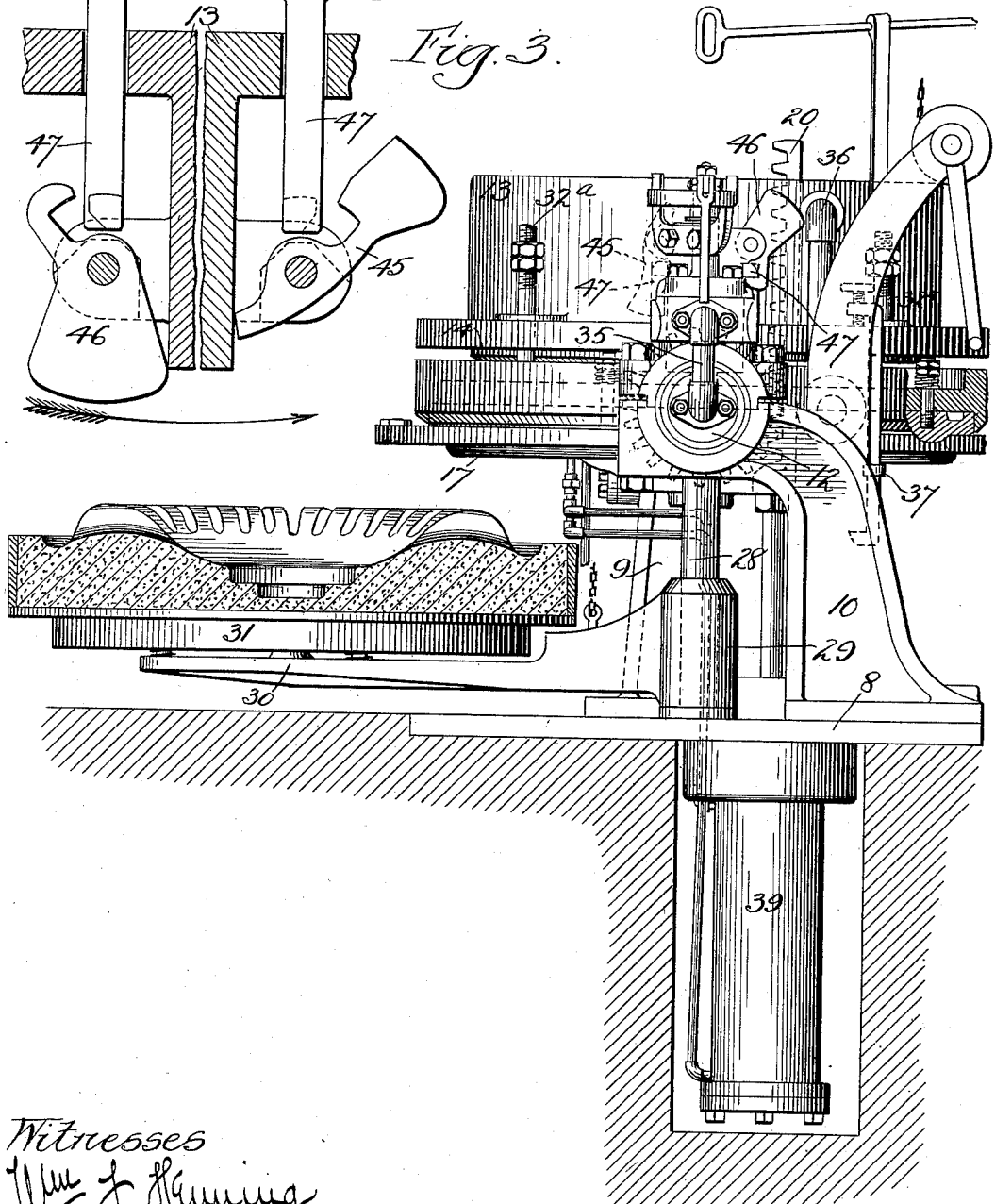

No. 612,801. Patented Oct. 18, 1898.
W. W. DOOLITTLE.
MOLDING MACHINE.
(Application filed Oct. 11, 1897.)
(No Model.) 5 Sheets—Sheet 4.
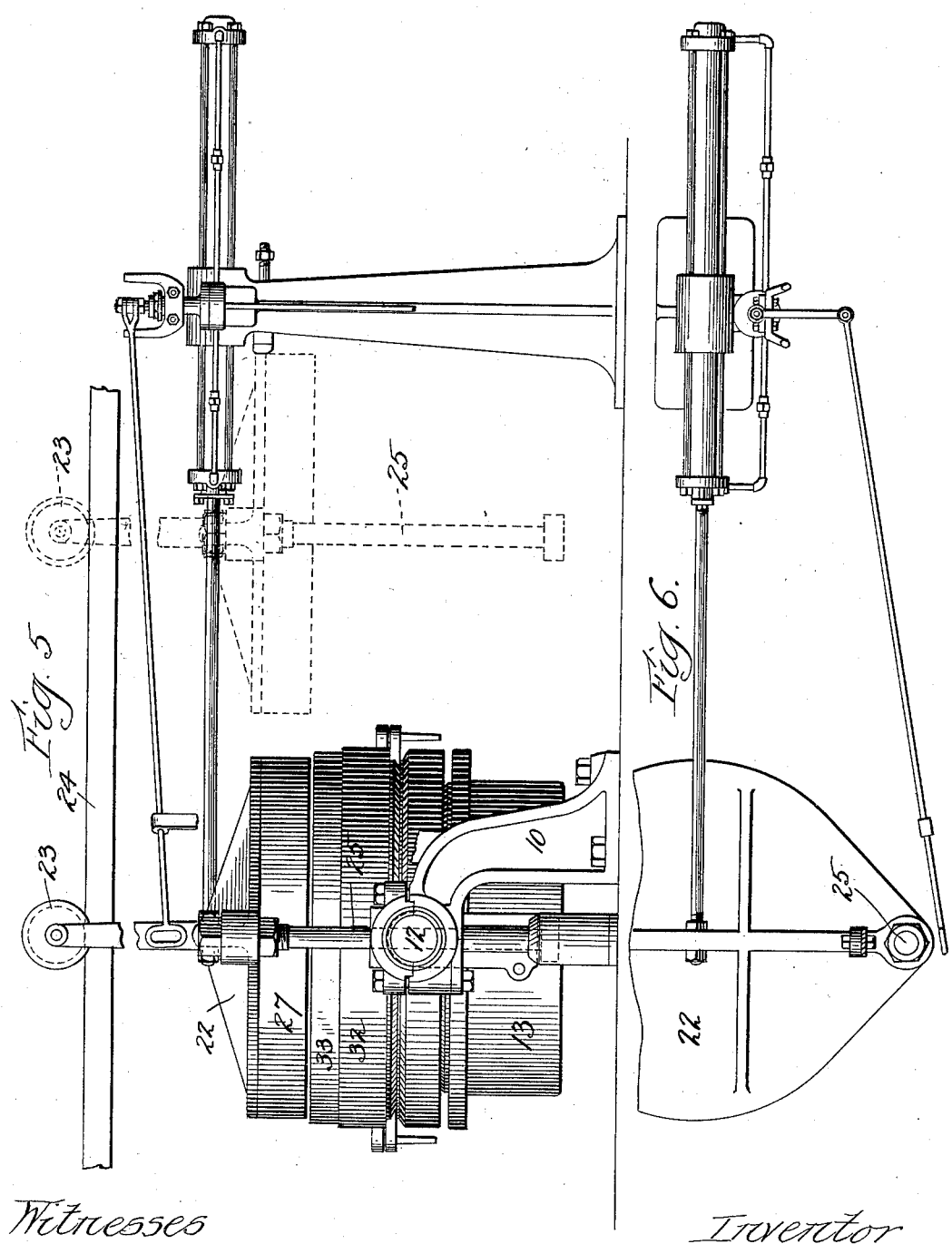

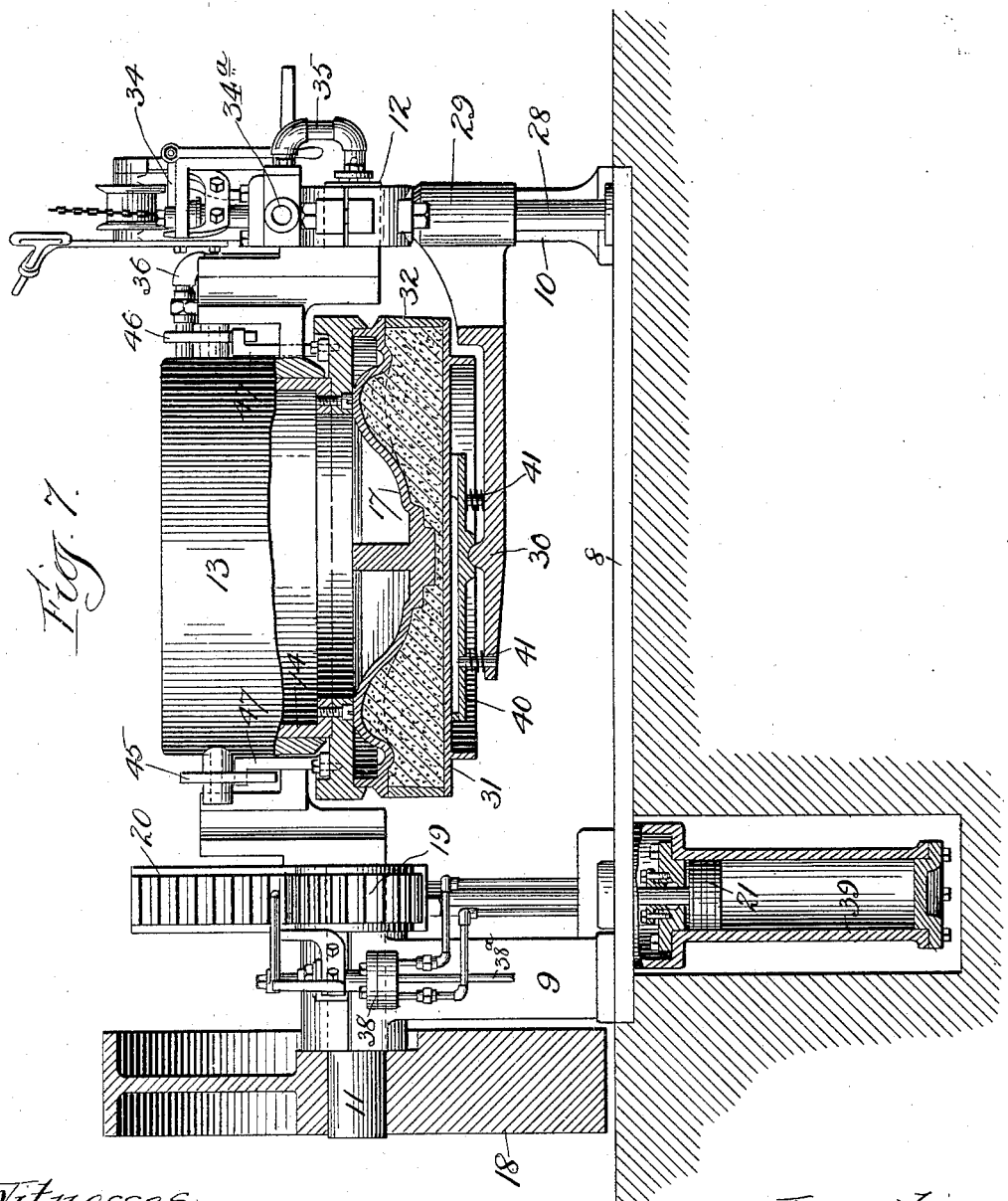

UNITED STATES PATENT OFFICE.

WILLIAM W. DOOLITTLE, OF CHICAGO, ILLINOIS, ASSIGNOR TO THE GRIFFIN WHEEL COMPANY, OF SAME PLACE.

MOLDING-MACHINE.

SPECIFICATION forming part of Letters Patent No. 612,801, dated October 18, 1898.

Application filed October 11, 1897. Serial No. 654,790. (No model.)

*To all whom it may concern:*

Be it known that I, WILLIAM W. DOOLITTLE, a citizen of the United States, residing in Chicago, in the county of Cook and State of Illinois, have invented certain new and useful Improvements in Molding-Machines, of which the following, taken in connection with the accompanying drawings, is a specification.

Machines of the class mentioned, as heretofore constructed, may be divided into two general types or kinds—one in which a plurality of compressing devices, together with their respective flasks, pattern-plates, and platens, have been mounted upon trunnions, whereby the whole may be rotated to bring each into operation in turn, and another or second class in which the common practice was to mount both the platen and compressing mechanism upon a fixed frame, to place trunnions upon the flask, to lift the flask off from the pattern after the compression of the sand and swing it around to one side, and then turn over or invert the mold.

Machines of the class or type first above referred to have been but little used, partly because they are obviously adapted only to very small work and partly because they are clumsy and awkward to handle even when used on such small work.

The second class or type of machine, to which reference has been above made, has come into more general use, but has proven in practice to be objectionable for several reasons, among which may be mentioned the fact that the scheme or method of operation employed involves considerable delay and the further fact that in order to make it possible to lift the flask off from the pattern (which is required in the formation of the drag part of the mold upon such machines) the flask must either be made of very great depth or provided with sand-retaining bars or the mold will fall to pieces during the lifting operation. A deep flask and a flask with sand-retaining bars are both objectionable, not only on the ground of added expense, but because they introduce other complications into the molding operation, such as greater depth of sand and getting proper compression of the sand around and below the bars. Besides that they are much heavier and more difficult to handle.

In the practice of my invention I aim to overcome all the enumerated objections to both of the types of machines mentioned by mounting the compressing mechanism itself upon trunnions supported on a fixed frame, arranging the platen separate from the compressing mechanism, and providing means whereby the compressing mechanism, together with the pattern-plate and flask, may be inverted independently of the platen.

In carrying out my invention I prefer to employ a platen, a fixed frame, and a compressing mechanism comprising a trunnioned fluid-pressure cylinder, a ram within the cylinder, a pattern-plate carried by the ram, the cylinder, ram, and pattern-plate being invertible independently of the platen, and means for the admission of fluid-pressure into the cylinder for the operation of the ram. As a ready means of communication with the inside of the cylinder and against the operating-ram I provide a fluid-pressure passage-way in one of the cylinder-trunnions, and for the operation of the whole I employ a valve of suitable construction to govern the supply to and exhaust from such fluid-pressure passage-way.

In order to bring the center of gravity of the cylinder and ram as near to the axial center of the trunnions as possible, I construct both the cylinder and ram with concave ends, and in order to make the operation of the machine lighter and easier I attach to the outer end of one of the trunnions a counterbalance-weight, preferably in a form resembling a disk or pulley.

In order to prevent the ram from dropping out of the cylinder when the latter is inverted, I provide an arrangement of locking devices constructed to act automatically as the cylinder is turned upon its trunnions and to fall out of engagement (so as not to interfere with the compression of the mold) when the cylinder is turned with the ram uppermost.

As a ready means of inverting the cylinder and ram I provide, in connection with one of the trunnions, a power mechanism, preferably comprising a rack and pinion and fluid-pressure cylinder connected therewith, the operation of the same being controlled by a fluid-pressure valve in a manner to be hereinafter more particularly described.

In order to receive the mold when the cylinder and ram are inverted, I provide a rotating table pivoted on a vertical axis, so that it may swing out of the way when the cylinder is downward and be brought around into place after the mold is completed, and in order to raise and lower this rotating table I provide suitable mechanism, preferably a small winch. The supporting-plate of the rotating table is made to rest upon a central pivot and balanced in horizontal position by a plurality of spring-supports constructed to yield when the mold is put thereon and making it automatically adjustable.

In order to automatically agitate the pattern as it is being separated from the mold, I provide a small air-cylinder with a rapping-plunger attached thereto constructed to tap the pattern as the same is being separated therefrom, and the pattern itself I support in position during this operation by a plurality of springs to allow the same a small amount of vertical play.

Other features of my invention will more clearly appear by an examination of the accompanying drawings, in which—

Figure 1 shows an elevation of my improved molding-machine with some portions thereof in section. Fig. 2 is a plan view thereof. Fig. 3 is an end elevation. Fig. 4 is an enlarged view of the locking device, which prevents the ram from dropping when the cylinder is inverted. Fig. 5 is a view showing the mechanism used for moving the platen. Fig. 6 is a partial plan view of the apparatus illustrated in Fig. 5; and Fig. 7 is a side elevation, partly in section, showing the cylinder, ram, and mold after they have been inverted.

Referring now more particularly to Fig. 1, it will be seen that my machine is erected upon a supporting plate or bed 8, to which are secured the pedestals 9 and 10, which form the main support for the trunnions 11 and 12. The trunnions are cast integrally with the cylinder 13, and within the cylinder 13 is arranged a ram, both cylinder and ram being made with a concave under surface 15 16 in order to bring the center of gravity of the whole as near the axial center of the trunnions as possible. To the ram 14 is secured a pattern 17, and to balance the cylinder, ram, and pattern a loaded disk 18 is secured upon the outer end of the trunnion 11. To the trunnion 11 is also secured a pinion 19, adapted to be rotated by a vertical movement of the rack 20 through the medium of the piston 21.

Above the pattern is arranged the platen 22, suspended upon overhead pulleys 23, riding upon the tracks 24. (See Fig. 5.) To the platen are secured a pair of strain-rods 25, constructed to engage the recessed openings 26 in the cylinder-trunnions when the platen stands in position over the pattern. To the platen is attached a rammer-head 27, made of a form to secure the proper degree of compression of the sand in every part of the mold.

Between the bearing of the trunnion 12 and the bed-plate of the machine is arranged a vertical shaft 28, carrying the hub 29 of a swinging table 30, which is designed to support the completed mold.

I will now proceed to describe the operation of my invention in connection with the formation of the drag portion of a mold for car-wheels, from which its application and use in the manufacture of other forms will be readily understood.

The parts standing in the position shown in Fig. 1, the cylinder hanging downward, with the ram and pattern uppermost, a flask 32 is placed over the pattern, and upon the flask is placed a sand-box 33. The platen 22 having been moved back out of the way, (this movement being preferably secured by mechanism which I have described and claimed in another application, filed October 11, 1897, Serial No. 654,792,) sand is put in and struck off level with the top of the sand-box. The platen is then brought forward above the flask. The strain-rods 25 engaging the notches 26, as described, air is admitted to the cylinder from the valve 34 through the pipe 35, the passage-way in the trunnion 12, and pipe 36, the pressure forcing the ram and pattern upward against the rammer-head 27 and compressing the sand, the rammer-head being forced into the sand-box to a point about even with the flask 32, the stop-bolts 32$^a$ limiting the extent of its movement. The valve 34 is then turned to exhaust the pressure, the ram, pattern, and flask falling back to the position shown in Fig. 1, the platen 22 is moved back out of the way, and the sand-box being removed the sand is struck off level with the top of the flask 32. Valve 34 may receive its supply of compressed air or other operating fluid from any convenient source, such fluid entering the valve-casing through the pipe connection 34$^a$. The bottom board 31 is now put on the flask 32 and secured to the pattern-plate by means of the clamps 37. (Shown in Figs. 2 and 3.) By the movement of another valve 38, which receives a supply of operating fluid, preferably air, from any convenient source through the pipe connection, (marked 38$^a$,) air is now admitted to the cylinder 39, moving the piston 21, and this by means of the pinion 19 inverts the cylinder and mold, swinging them to the position shown in Fig. 7. The swinging table 30 is now swung around under the mold and raised up to the same by means of the winch 39. The automatically-adjustable plate 40, which is pivotally carried at its center upon a fixed support and has arranged around such fixed support a plurality of spring-supports 41 for holding it in horizontal position, takes the weight of the mold, when the clamps 37 can be removed. The table 30 is now lowered, the mold separating from the pattern and being brought around to the position shown in Fig. 3, ready to be taken off the machine and placed in position to receive the cope.

As the weight of the ram is considerable, it would naturally tend to fall outward when the cylinder was inverted if this were not prevented by some means. In order to avoid this difficulty, I provide a novel arrangement of locking devices, (shown in Figs. 1, 3, and 4,) comprising a pair of weighted dogs 45 and 46, arranged on opposite sides of the cylinder. These dogs are constructed to engage the lugs 47ᵃ, the hooked rods 47, attached to the ram at its outer end, and act automatically to lock the ram and prevent its dropping out when the cylinder is turned. The direction of rotation of the cylinder is shown by the arrow in Fig. 4.

Having thus described my invention, what I claim as new, and desire to secure by Letters Patent, is—

1. A molding-machine comprising a platen, a fixed frame, a trunnioned cylinder carried by said frame and invertible independently of said platen, a ram within said cylinder, a pattern-plate carried by said ram, and means for the admission of fluid-pressure into said cylinder for the operation of the ram, substantially as described.

2. In a molding-machine, the combination with a trunnioned cylinder, a ram within the same, and a pattern-plate carried by said ram, of means for inverting said cylinder and locking devices constructed to hold said ram in retracted position when the cylinder is inverted, substantially as described.

3. A molding-machine comprising a platen and fixed frame in combination with compressing mechanism, trunnioned upon said frame and invertible independently of said platen, an air-cylinder, a piston within the same, and connections between said piston and said compressing mechanism whereby the latter is inverted, substantially as described.

4. A molding-machine comprising a platen and a fixed frame in combination with compressing mechanism, trunnioned upon said frame and invertible independently of said platen, an air-cylinder, a piston within the same, connections between said piston and said compressing mechanism whereby the latter is inverted, and a valve controlling the operation of said air-cylinder, substantially as described.

5. A molding-machine comprising the combination of a frame, an invertible cylinder trunnioned thereon, a ram operating in said cylinder, a pattern-plate carried by said ram, and a weight constructed to counterbalance said cylinder, pattern-plate and ram, the cylinder and ram each having a concave end, substantially as shown and described.

6. A molding-machine comprising a platen, a fixed frame, compressing mechanism separate from said platen and trunnioned upon said frame so as to be invertible independently of said platen, a pattern-plate carried by said compressing mechanism, a vertically-movable swinging table pivotally supported on a vertical axis in position to be brought under said pattern-plate after it has been inverted, and to remove the mold therefrom.

7. A molding-machine comprising a platen, a fixed frame, compressing mechanism separate from said platen and trunnioned upon said frame so as to be invertible independently of said platen, a pattern-plate carried by said compressing mechanism, a vertically-movable swinging table pivotally supported on a vertical axis in position to be brought under said pattern-plate after it has been inverted, and to remove the mold therefrom, and an adjusting-plate carried by said table.

8. In a molding-machine, a mold-transferring device provided with a plate pivotally supported at its center upon a fixed point, and having a plurality of spring-supports arranged around said central support.

WILLIAM W. DOOLITTLE.

Witnesses:
PAUL SYNNESTVEDT,
LOUIS K. GIELSON.